United States Patent [19]

Mirua et al.

[11] Patent Number: 4,683,002

[45] Date of Patent: Jul. 28, 1987

[54] LIQUID COMPOSITION AND METHOD FOR RECORDING

[75] Inventors: Konoe Mirua; Hiroshi Takimoto, both of Yokohama; Toshio Kaneko, Machida; Tokuya Ohta, Yokohama; Masatsune Kobayashi, Yokohama; Tsuyoshi Eida, Yokohama, all of Japan

[73] Assignee: Canon Kabushiki Kaisha, Tokyo, Japan

[21] Appl. No.: 795,416

[22] Filed: Nov. 6, 1985

[30] Foreign Application Priority Data

Nov. 8, 1984 [JP] Japan ................... 59-234204

[51] Int. Cl.$^4$ .............. C09D 11/00; G01D 9/00; G01D 15/18
[52] U.S. Cl. ..................... 106/20; 106/22; 346/75
[58] Field of Search ............ 106/20, 22; 427/421; 346/1, 75

[56] References Cited

U.S. PATENT DOCUMENTS 4,373,954  2/1983  Eida et al. ............... 106/20

*Primary Examiner*—Theodore Morris
*Attorney, Agent, or Firm*—Fitzpatrick, Cella, Harper & Scinto

[57] ABSTRACT

A liquid composition comprising a water-soluble dye is provided. The composition contains iron and silicon at a concentration of 9 ppm or less. A method for recording with liquid droplets formed from the liquid composition is also provided. Further, a water soluble dye for the liquid composition is provided, the dye containing iron and silicon at a total concentration of 250 ppm or less.

17 Claims, No Drawings

LIQUID COMPOSITION AND METHOD FOR RECORDING

BACKGROUND OF THE INVENTION

1. Field of the Invention

This invention relates to a liquid composition for recording on a recording material such as paper, resin film, etc. according to an ink-jet system or by a writing instrument such as a fountainpen, a felt pen, etc., generally called "ink", (the liquid composition will be hereinafter referred to as "ink"), and to a method for recording with the ink.

2. Description of the Prior Art

The ink jet recording system comprises forming ink droplets according to any of various ink injection systems (e.g. an electrostatic suction system, a system of giving mechanical vibrations or displacements to an ink by a piezoelectric device, a system of heating an ink and utilizing the pressure developed thereby, etc. are known), and then depositing a portion or all of the ink droplets onto a recording material such as paper, etc., thereby making recording. In the case of using a writing instrument such as a fountainpen, a felt pen, a ballpoint pen, etc., the recording is made by discharging an ink through capillaries and allowing the recording material to accept the discharged ink as is well known. The known ink for use in the ink jet recording system or for the writing instrument includes solutions or dispersions of various water-soluble dyes or pigments in water or a liquid medium comprising water and a water-soluble organic solvent.

It is needless to say that various properties are required for the conventional ink as described above, and the most important property is, among others, such a liquid stability that neither clogging nor precipitation takes place in a nozzle or orifice or at a pen edge of recording apparatus during the recording with the ink, or during interruptions of recording, or during a prolonged intermission. In the ink jet system, particularly an ink jet system based on a thermal energy, the liquid stability is particularly important, because foreign matters are liable to deposit on the surface of a thermal head due to changes in temperature. In the case of the conventional ink, several additives are required to satisfy various conditions such as ink discharge conditions, a long term storage stability, distinctness and density of an image during the recording, surface tension, electrical properties, etc., or various impurities are inevitably contained in the dyes. Thus, there are various problems such as clogging in the nozzle or orifice of an ink jet device, deposition on the surface of a thermal head, precipitation during the long term storage etc., which are reasons for delayed spread of the ink jet recording system in spite of its various distinguished characteristics.

SUMMARY OF THE INVENTION

An object of the present invention is to overcome the disadvantages of the prior art and provide an ink with such a distinguished stability that no clogging takes place in an nozzle, orifice, etc. during the recording as well as during the long term storage, or no deposition takes place particularly on a thermal head of an ink jet device using a thermal energy, and a method for recording on a recording material such as paper, resin film, etc. with the ink.

According to an aspect of the present invention, there is provided a liquid composition comprising a water-soluble dye, wherein said composition has a total concentration of iron and silicon at 9 ppm or less.

According to another aspect of the present invention, there is provided a method for recording with liquid droplets made from a liquid composition, comprising utilizing the liquid composition containing a water-soluble dye in which total concentration of iron and silicon is 9 ppm or less.

According to a further aspect of the present invention, there is provided a water-soluble dye for preparation of a liquid composition containing a water-soluble dye, wherein a total content of iron and silicon in water-soluble dye is 250 ppm or less.

DESCRIPTION OF THE PREFERRED EMBODIMENTS

As a result of extensive studies to attain the said object, the present inventors have found that the commercially available dyes contain many impurities (e.g. various organic and inorganic matters such as a dispersant, a levelling agent, etc.) beside the dyes themselves, and these impurities mainly cause the said problems. As a result of further studies of various influences by these impurities, the present inventors have found that the largest cause for clogging in the nozzle or orifice, and precipitation during the preservation of ink, particularly deposition of foreign matters on the thermal head according to an ink jet system using a thermal energy is iron and silicon contained in the ink and the said various problems can be solved by using an ink free from such impurities, and have established the present invention.

The present invention will be described in detail below. The basic components of an ink for use in the present invention are well known by themselves, and the dye is a water-soluble dye such as a direct dye, an acid dye, a basic dye, a reactive dye, etc. The dyes suitable as an ink for the ink jet recording system and satisfying the properties required for it, e.g. distinctness, water solubility, stability, light fastness, etc. include, for example, C.I. Direct Black 17, 19, 32, 51, 71, 108, and 146; C.I. Direct Blue 6, 22, 25, 71, 86, 90, 106, and 199; C.I. Direct Red 1, 4, 17, 28, and 83; C.I. Direct Yellow 12, 24, 26, 86, 98, and 142; C.I. Direct Orange 34, 39, 44, 46, and 60; C.I. Direct Violet 47, and 48; C.I. Direct Brown 109; C.I. Direct Green 59; C.I. Acid Black 2, 7, 24, 26, 31, 52, 63, 112, and 118; C.I. Acid Blue 9, 22, 40, 59, 93, 102, 104, 113, 117, 120, 167, 229, and 234; C.I. Acid Red 1, 6, 32, 37, 51, 52, 80, 85, 87, 92, 94, 115, 180, 256, 317, and 315; C.I. Acid Yellow 11, 17, 23, 25, 29, 42, 61, and 71; C.I. Acid Orange 7, and 19; C.I. Acid Violet 49; C.I. Basic Black 2; C.I. Basic Blue 1, 3, 5, 7, 9, 24, 25, 26, 28, and 29; C.I. Basic Red 1, 2, 9, 12, 13, 14, and 37; C.I. Basic Violet 7, 14, and 27; C.I. Food Block 1, and 2, etc. The foregoing examples of the dyes are particularly preferable for the ink applicable to the present method for recording, but the present invention will never be limited to these dyes.

Generally, about 0.1 to about 20% by weight of the water-soluble dye is used in the conventional ink on the basis of the total weight of ink. In the present invention, the water-soluble ink can be used, of course, within the said range, but it has been found by the present inventor that even use of the water-soluble dye in an amount over the said conventional range gives a better liquid stability without any precipitation than that of the conventional ink.

The solvent of the present invention and the solvent for use in the ink according to the method of the present invention is water or a mixture of water and a water-soluble organic solvent. A particularly preferable solvent in a mixture of water and a water-soluble organic solvent, where the water-soluble organic solvent includes a polyhydric alcohol having an effect on prevention of an ink from drying, and the water is not the ordinary water containing various ions, but preferably deionized water. Examples of the water-soluble organic solvent for use together with water includes alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethyl formamide, dimethyl acetamide, etc.; ketones or ketoalcohol such as acetone, diacetone alcohol, etc.; ethers such as tetrahydrofuran, dioxane, etc.; polyalkylene glycols such as polyethylene glycol, polypropylene glycol, etc.; alkylene glycols whose alkylene group has 2 to 6 carbon atoms, such as ethylene glycol, propylene glycol, butylene glycol, triethylene glycol, 1,2,6-hexanetriol, thiodiglycol, hexylene glycol, diethylene glycol, etc.; glycerine; lower alkyl ethers of polyhydric alcohols such as ethylene glycol methyl (or ethyl) ether, diethylene glycol methyl (or ethyl) ether, triethylene glycol monomethyl (or ethyl) ether, etc.; N-methyl-2-pyrrolidone, 1,3-dimethyl-2-imidazolidinone, etc. Among these many water-soluble organic solvents, polyhydric alcohols such as diethylene glycol, etc., and lower alkyl ethers of polyhydric alcohols such as triethylene glycol monomethyl (or ethyl) ether, etc. are preferable.

Generally, the content of the water-soluble organic solvent in the ink is 0 to 95% by weight, preferably 10 to 80% by weight, and more preferably 20 to 50% by weight on the basis of the total weight of ink.

The content of water depends on the species of the said solvent component, its composition or desired ink characteristics, and can be selected in a wide range, but is generally 10 to 100% by weight, preferably 10 to 70% by weight, and more preferably 20 to 70% by weight on the basis of the total weight of ink.

The basic ink components used in the present invention are as described above, and the present invention is characterized in that the total content of iron and silicon contained in the ink is adjusted to 9 ppm or less. It is desirable that the iron content is controlled to 4 ppm or less in the total content of iron and silicon.

As a result of extensive studies of the ink stability on the basis of the knowledge that, since the dyes so far used in the conventional ink are prepared for dying of fibers, the dyes contain various additives, such as a surfactant and a levelling agent as well as very many impurities such as sodium chloride, sodium sulfate, salts of alkaline earth metals, etc., and these impurities cause various troubles in the ink jet recording and writing instruments, the present inventors have found that the troubles can be solved to a considerable degree by intensively removing these impurities from the dyes to make the dyes of high purity for the ink, but the deposition of foreign matters on a thermal head cannot be fully prevented in the ink jet system, particularly in the ink jet system using a thermal energy. As a result of further detailed studies, the present inventors have found by analysis of depositions that the main components of the depositions are iron and silicon, and further that the amount of depositions is in good correlationship with the total amount of iron and silicon in the ink, and has established the present invention. It is known that the commercially available dyes contain a considerable amount (several tens to several hundreds ppm) of iron and silicon.

A procedure for adjusting the content of iron and silicon in the ink will be described in detail below.

First of all, sodium sulfate is added to an aqueous dye solution at a desired concentration to salt out the dye. Then, the deposited precipitates are recovered by filtration, washed with a saturated solution of sodium sulfate in pure water, and then dried. A predetermined amount of the thus obtained dried solid matters is dissolved in a water-soluble organic solvent, and the resulting solution is filtered to obtain a filtrate. In that case, any water-soluble organic solvent can be used, so long as it can serve as a poor solvent for sodium sulfate and as a good solvent for the dye. A most suitable solvent can be selected in view of the structure of a dye to be treated. Usually, alcohols, glycols, and glycol ethers can be preferably used as a solvent. The thus obtained filtrate is left for 1 to 3 days, and then refiltered.

Then, a predetermined amount of water is added to the filtrate, and the resulting mixture is stirred and passed through a cation exchange resin layer. Then, an additive is added thereto, if required, and the mixture is stirred to prepare an ink. Then the contents of iron and silicon in the ink are determined by an atomic absorption spectrometer or an inductively coupled plasma emission spectrometer to confirm whether the total content of iron and silicon contained is 9 ppm or less, and whether preferably the content of iron is 4 ppm or less. The ink can be placed at practical use, if the contents of iron and silicon are satisfactory.

In the foregoing procedure, the initial salting-out treatment is mainly to remove sodium chloride which is a typical impurity contained in most of the commercially available ordinary dyes, and the next treatment with the water-soluble organic solvent is to remove sodium sulfate originally contained as an impurity in the dye and the sodium sulfate much added in the salting-out treatment. The refiltration after the standing of the filtrate for a long term is mainly to remove colloidal matters containing iron and silicon in the solution. The subsequent treatment with the cation exchange resin is to remove the iron ions contained.

In the foregoing, one procedure for adjusting the contents of iron and silicon in the ink has been described, but the adjustment is not restricted thereto. That is, any procedure can be effectively utilized, so long as it can remove ionized iron or colloidal iron compounds, silicon compounds, etc. For example, an procedure of exposure to air, a coagulation-precipitation procedure using a coagulant, a filtration procedure, a limesoftening procedure, an electrolytic procedure, etc. can be used.

As a contamination source of iron and silicon as impurities, water to be used can be mentioned beside the dye to be used. Contamination of iron and silicon can be prevented by using treated water such as distilled water, ion-exchanged water, or a mixture thereof as water for the ink. Most contamination source of iron and silicon is the dye to be used. Particularly when the dye to be used is a commercially available product, their contents are very high in the most cases.

In the foregoing, removal of iron and silicon contained in the ink has been mainly described, but actually it is the ordinary expedient to remove various inorganic salts such as sodium chloride, sodium sulfate, etc., or calcium, etc. together with the removal of iron and silicon.

The above embodiment of the treatment is described referring to commercial dyes which contain a considerable quantity of impurity. When the dye itself is highly pure resulting from a pure starting material or when synthesized dye product is purified, not all of the above-mentioned treatments is needed, thus the treating process may be advantageously simplified.

A powder or water solution of the dye of high purity may be used for ink without or optionally with addition of an extra component as long as it satisfies the requirement of the invention as to the concentration of silicon and iron in the solution. For example: 5-30 weight % aqueous solution of the above-mentioned dye of high purity will contain only approximately 10-75 ppm of impurity, and is very useful as a constituent for an aqueous dye solution for ink.

The aqueous dye solution mentioned above may be employed as it is without adding a solvent, provided that the solution satisfies requirement for an ink such as concentrations of a dye, iron and silicon, etc.

The basic ink composition according to the present invention and that used in the method of the present invention are as described above.

In addition, various so far known dispersants, surfactants, viscosity-controlling agents, surface tension-controlling agents, etc. can be added thereto, if required, and for example, viscosity-controlling agents such as polyvinyl alcohol, cellulose, water-soluble resin, etc.; various cationic, anionic or nonionic surfactants; suface tension-controlling agents such as diethanolamine, triethanolamine, etc.; pH-controlling agents such as buffer solution; antifungal, etc. can be used.

To prepare an ink for use in ink jet recording of a type of electrically charging the recording solution, a resistivity-controlling agent such as inorganic salts, etc. e.g. lithium chloride, ammonium chloride, sodium chloride, etc. can be added thereto.

To prepare an ink for use in ink jet system of a type of injecting the ink under an action of thermal energy, thermal properties, for example, specific heat, coefficient of thermal expansion, thermal conductivity, etc. of the ink may be adjusted.

The thus obtained ink for use in the method of the present invention is completely free from the troubles of the prior art and is distinguished and well balanced, as such, in the recording characteristics in the ink jet system (signal response, stability of liquid droplet formation, discharging stability, continuous and prolonged recordability, and stability of ink discharging after prolonged interruption in working), storage stability, fixing property to a recording material, light fastness of recorded image, resistance to weathering, etc. and is useful as an ink for ink jet recording of various types or as an ink for writing instruments, and particularly suitable as an ink for ink jet recording system using a thermal energy, which mostly detests the deposition. In the present invention, distinguished recording can be obtained.

The present invention will be described in detail below, referring to Examples, where parts or % is by weight.

EXAMPLE 1

Preparation of Ink

At first, an aqueous 10% solution of commercially available dye, "Special Black 7984" (made by Bayer Co.) was prepared, and sodium sulfate was added to the aqueous solution. The solution was stirred to salt out the dye. The precipitates were recovered by filtration, washed with a saturated solution of sodium sulfate in pure water, and dried. The dried solid matters were weighed out to make the dye concentration of 3% in the resulting ink, and dissolved in a 3:1 mixture of ethylene glycol and N-methyl-2-pyrrolidone. Then, the resulting solution was filtered under pressure through a Teflon filter having an average pore size of 1 $\mu$m, and the filtrate was sealed in a plastic container and left in a cold dark place for three days. Then, the filtrate was refiltered through the Teflon filter having an average pore size of 1 $\mu$m. Then, 60 parts of water was added to 40 parts of the thus obtained filtrate with stirring to make an ink. Then, the ink was passed through a layer of cation exchange resin C-464 made by Sumitomo Kagaku Kogyo K.K., Japan, and then the ink was adjusted to pH 9.8 with an aqueous 1N sodium hydroxide solution. Total content of iron and silicon in the ink was determined by an inductively coupled plasma emission spectrometer and found to be 8.6 ppm (iron content: 3.6 ppm). The following items T1-T5 of the thus prepared ink were investigated in a recording apparatus with a multi-head of on-demand type of giving a thermal energy to an ink in the recording head to generate liquid droplets and to conduct recording (discharging orifice diameter: 35 $\mu$m; resistance of exothermic resistor: 150 ohms, driving voltage: 30 volts, frequency: 2KHz), and were found good throughout.

(T1) Long term storage stability: The ink was sealed in a plastic film bag and preserved at $-30°$ C. and $60°$ C. for 6 months, separately. No insoluble precipitates were found and no changes in the physical properties and color tone of the ink were found even thereafter.

(T2) Discharging stability: Discharging was carried out continuously for 24 hours in the respective atmospheres at room temperature, $5°$ C. and $40°$ C., and high quality stable recording was obtained in any of the stmospheres.

(T3) Discharge response: Intermitted discharing of the ink at intervals of 2 second and discharing of the ink 2 month after standing were investigated. Stable uniform recording was obtained without any clogging at the orifice edge in any of the discharings.

(T4) Quality of recorded image: The images recorded on the recording materials listed in Table 1 had a high optical density and a good distinctness. The percent decrease in the density was less than 1% 6 months after the exposure to room light.

(T5) Fixing property on various recording materials: After 15 seconds from printing on the recording materials in Table 1, the prints were rubbed with fingers to determine the presence of image aberration, spread, etc. Distinguished fixing property was obtained on any of the recording materials without image aberration, spreading, etc.

EXAMPLES 2-5

Inks were prepared with the commercially available dyes given in Table 2 in the same manner is in Example 1, and T1 to T5 of the inks were investigated in the same manner as in Example 1. All the inks had good results as in Example 1.

EXAMPLE 6

T1 to T5 of the ink of Example 2 as yellow ink, the ink of Example 3 as Magenta ink, the ink of Example 4 as cyan ink, and the ink of Example 5 as black ink were investigated in the same manner as in Example 1 in a recording apparatus having a recording head of on-demand type of discharging the ink by a piezo vibrator (discharging orifice diameter: 50 μm, piezo vibrator driving voltage: 60 volts, frequency: 4KHz). Any of the inks had good results.

EXAMPLE 7

With the ink of Example 2 as yellow ink, the ink of Example 3 as Magenta ink, the ink of Example 4 as cyan ink, and the ink of Example 5 as black ink, full color photographs were reproduced in the same ink jet recording apparatus as used in Examples 2 to 5. The resulting images were very distinct in the individual colors and had a good color reproduction.

EXAMPLE 8

The color inks prepared in Examples 2 to 5 were filled in felt pens separately, and the pens were left for 10 days with the caps taken away. Writing was made smoothly on paper with the pens without any blurring of inks.

COMPARATIVE EXAMPLE

An aqueous 10% solution of dye "Special Black 7984" shown in Example 1 was prepared, and sodium sulfate was added to the aqueous solution with stirring to salt out the dye. Then, the precipitates were recovered by filtration, washed with a solution of sodium sulfate in pure water, and dued. A predetermined amount of the dried solid matters were weighed out to make the dye concentration of 3% in the resulting ink, and dissolved in a 3:1 mixture of ethylene glycol and N-methyl-2-pyrolidone. Then, the solution was filtered under pressure through a Teflon filter having an average pore size of 1 μm, and 60% of water was added to 40% of the filtrate with stirring to make a sample ink.

The iron content of the ink was determined by an atomic absorption spectrometer and found to be 6.1 ppm. The silicon content was determined by an inductively coupled plasma emission spectrometer and found to be 4.5 ppm. T1 to T4 of the ink were determined in the same manner as in Example 1. Precipitation of insoluble matters was observed one month after the ink storage. In T2, the ink often failed to be discharged, and the driving voltage was forced to be changed (to increase the voltage). Observation of the thermal head surface by a microscope revealed deposition of brown precipitates.

In T3, the orifice was clogged after being left standing for one month, and the ink discharging was found unstable. Ink of the same dye obtained in the same manner as in Example 1, excluding only the standing treatment, and ink of the same dye obtained in the same manner as in Example 1 excluding only the cation exchange resin treatment were subjected to determination of total content of iron and silicon in the individual inks, and it was found that the total content of the former was 9.4 ppm, and that of the latter was 9.9 ppm. T1 to T5 of these inks were likewise investigated. Poor results were obtained, as compared with those of Example 1 with full treatments.

TABLE 1

| Recording material (Trade Name) | Classification | Manufacturer |
| --- | --- | --- |
| Ginkan | High quality paper | Sanyo-Kokusaku Pulp K. K. |
| Seven-Star | High quality paper | Hokuetsu Seishi K. K. |
| Hakubotan | Medium quality paper | Honshu Seishi K. K. |
| Toyo Filter Paper No.4 | No-sized Paper | Toyo Filter Paper K. K. |

TABLE 2

| Ex. No | Dye | Content of iron & silicon in ink |
| --- | --- | --- |
| 2 | Water Yellow 6 (made by Orient Kagaku Kogyo K. K.) | 7.2 ppm (Fe: 3.5 ppm) |
| 3 | Chuganol Fast Red 3B (made by Chugai Kasei K. K.) | 6.8 ppm (Fe: 3.1 ppm) |
| 4 | Kayarus Turqoise Blue GL (made by Nihon Kayaku K. K.) | 8.4 ppm (Fe: 4.0 ppm) |
| 5 | Supranol Fast Black VLG (made by Bayer Co.) | 7.9 ppm (Fe: 3.8 ppm) |

EXAMPLE 9

1. Purification of Amines as a Starting Material 173 g of sulfanilic acid was added into 1.7 l of distilled water, and heated to 80° C. to make a solution. Then the solution was filtered at that temperature. The filtrate was left stand to cool to room temperature and the resulting precipitate was collected by filtration and washed with 0.3 l of distilled water to obtain 152 g of purified sulfanilic acid (in terms of the pure compound).

233 g of 1-aminonaphthalene-7-sulfonic acid was added to 2.2 l of distilled water, and the solution was treated in the same manner as described above to obtain 200 g of purified cake (in terms of a pure product).

319 g of 1-hydroxy-7-aminonaphthalene-3,6-disulfonic acid was added to 3.2 l of distilled water, and the solution was treated in the same manner as described above to obtain 255 g of purified cake (in terms of a pure product).

2. Synthesis of Dyes (1) Preparation of First Diazo Solution 17.3 g of the aforementioned purified sulfanilic acid and 25 ml of 35% hydrochloric acid were added to 340 ml of distilled water, and agitated for 3 hours to obtain a homogeneous slurry. Thereto 250 g of ice prepared from distilled water was added and cooled to 3° C. To the slurry, an aqueous solution of 7.3 g of sodium nitrite in 73 ml of distilled water was added. The solution was stirred at 3° C. for one hour to be diazotized, followed by addition of 2 g of sulfamic acid to decompose the remaining sodium nitrite, thus giving first diazo solution.

(2) First Coupling 22.3 g of the above-mentioned purified 1-aminonaphthalene-7-sulfonic acid was added to 670 ml of distilled water, and stirred for 2 hours to give a homogeneous slurry. Thereto added were 300 g of ice prepared from distilled water, the first diazo solution described above and 20 ml of 25% sodium hydroxide, and the mixture was stirred at 0°–3° C. and at pH 2-3 for 15 hours to carry out coupling reaction. Then 200 g of sodium chloride (Japanese pharmacopoeia grade) was added to salt out the monoazo compound, which was collected by filtration and washed with 500 ml of 10% solution of sodium chloride (Japanese pharmacopoeia grade), and dried to give 35.6 g of monoazo compound shown below.

Hereinafter "water" means distilled water, "ice" means ice prepared from distilled water, and "sodium chloride" means the one of the Japanese pharmacopoeia grade.

(3) Preparation of Second Diazo Solution

The entire monoazo compound obtained according to item (2) above was added to 800 ml of 5% hydrochloric acid and stirred for 5 hours to give a homogeneous slurry, 800 g of ice was added thereto and cooled to 3° C. To this slurry, a solution of 7.3 g of sodium nitrite in 73 ml of water was added. Subsequently, it was diazotized with stirring at 3° C. for 10 hours and 2 g of sulfamic acid was added to decompose the remaining sodium nitrite to obtain second diazo solution.

(4) Second Coupling 31.9 g of purified 1-hydroxy-7-amino-naphthalene-3.6-disulfonic acid prepared as above was added to 900 ml of water. To this solution, 1200 g of ice, the second diazo solution obtained according to item (2) above and 100 ml of 25% sodium hydroxide solution were added and subjected to coupling reaction at pH 8–10, and at a temperature 2°–5° C. After stirring for 5 hours at the same temperature and pH, 400 g of sodium chloride was added to salt out a compound, which was filtered and washed with 300 ml of 10% aqueous sodium chloride solution, and dried to give 59.2 g of a disazo dye of the formula below:

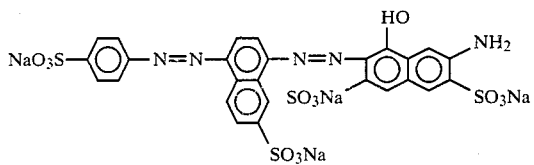

The contents of iron and silicon in the above disazo dye were determined as being 35 ppm and 27 ppm respectively.

3. Preparation of Ink

The desired quantity of disazo dye prepared according to item (2) above was weighed out so as to give the dye concentration of 3% in the ink, and dissolved in a mixed solution of ethylene glycol and N-methyl-2-pyrrolidone (mixing ratio: 3 to 1), and thereto 1.5 times weight of water based on this solution was added to obtain ink. The total content of iron and silicon was 1.96 ppm (1.15 ppm iron, and 0.81 ppm silicon). The test T1 to T5 were performed in the same manner as in Example 1 by using the ink prepared above. The results were all satisfactory as Example 1.

We claim:

1. A liquid composition comprising a water-soluble dye, wherein said composition has a total concentration of iron and silicon at 9 ppm or less.

2. A liquid composition according to claim 1, wherein concentration of iron is 4 ppm or less.

3. A liquid composition according to claim 1, wherein a concentration of the water-soluble dye is within a range from 0.1 to 20% by weight.

4. A liquid composition according to claim 1, wherein water is contained as a solvent.

5. A liquid composition according to claim 1, wherein a mixture of water and a water-soluble organic solvent is contained as a solvent.

6. A liquid composition according to claim 4, wherein the water is deionized water.

7. A liquid composition according to claim 5, wherein the water-soluble organic solvent is a polyhydric alcohol.

8. A method for recording with liquid droplets made from a liquid composition, comprising utilizing the liquid composition containing a water-soluble dye in which total concentration iron and silicon is 9 ppm or less.

9. A method according to claim 8, wherein the liquid composition is made into liquid droplets under an action of thermal energy.

10. A method according to claim 8, wherein a concentration of iron is 4 ppm or less.

11. A method according to claim 8, wherein a concentration of the water-soluble dye is within a range from 0.1 to 20% by weight.

12. A method according to claim 8, wherein water is contained as a solvent in the liquid composition.

13. A method according to claim 8, wherein a mixture of water and a water-soluble organic solvent is contained as a solvent in the liquid composition.

14. A method according to claim 12, wherein the water is deionized water.

15. A method according to claim 13, wherein the water-soluble organic solvent is a polyhydric alcohol.

16. A liquid composition according to claim 5, wherein the water is deionized water.

17. A method according to claim 13, wherein the water is deionized water.

* * * * *

UNITED STATES PATENT AND TRADEMARK OFFICE
CERTIFICATE OF CORRECTION

PATENT NO. : 4,683,002
DATED : July 28, 1987
INVENTOR(S) : KONOE MIRUA, ET AL.

It is certified that error appears in the above-identified patent and that said Letters Patent is hereby corrected as shown below:     Title page:

AT [73] UNDER THE ASSIGNEE

Lines 1-2,    "Canon Kabushiki Kaisha, Tokyo, Japan" should read --Canon Kabushiki Kaishi, Tokyo Japan and Mitsubishi Chemical Industries, Ltd., Tokyo, Japan--.

COLUMN 9

Line 25,    "3.6-disulfonic" should read --3,6-disulfonic--.

COLUMN 10

Line 30,    "concentration iron" should read --concentration of iron--.

Signed and Sealed this

Fifteenth Day of December, 1987

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,683,002
DATED : July 28, 1987
INVENTOR(S) : KONOE MIURA, et al.

It is certified that error appears in the above-identified patent and that said Letters Patent is hereby corrected as shown below:

On the title page, under item [19] and item [75], "Mirua" should read --Miura--.

Signed and Sealed this

Sixteenth Day of March, 1999

Attest:

Q. TODD DICKINSON

Attesting Officer

Acting Commissioner of Patents and Trademarks